US012391162B2

United States Patent
Lee et al.

(10) Patent No.: US 12,391,162 B2
(45) Date of Patent: Aug. 19, 2025

(54) ARMREST ASSEMBLY FOR REAR SEAT OF VEHICLE

(71) Applicants: Hyundai Motor Company, Seoul (KR); Kia Corporation, Seoul (KR); Hyundai Transys Inc., Seosan-si (KR); Hyundai Ind. Co., Ltd., Ulsan (KR)

(72) Inventors: Tae Hoon Lee, Suwon-si (KR); Ji Hwan Kim, Seoul (KR); Byeong Seon Son, Seoul (KR); Sang Ho Kim, Incheon (KR); Sang Hoon Park, Incheon (KR); Il Hwan Bae, Suwon-si (KR); Jeong Ho Kim, Ulsan (KR); Bong Jae Jeong, Anyang-si (KR); Min Soo Kim, Ulsan (KR)

(73) Assignees: HYUNDAI MOTOR COMPANY KIA CORPORATION, Seoul (KR); KIA CORPORATION, Seoul (KR); HYUNDAI TRANSYS INC., Seosan-si (KR); HYUNDAI IND. CO., LTD., Ulsan (KR)

( * ) Notice: Subject to any disclaimer, the term of this patent is extended or adjusted under 35 U.S.C. 154(b) by 268 days.

(21) Appl. No.: 18/303,154

(22) Filed: Apr. 19, 2023

(65) Prior Publication Data
US 2024/0149767 A1 May 9, 2024

(30) Foreign Application Priority Data
Nov. 7, 2022 (KR) .......... 10-2022-0146999

(51) Int. Cl.
B60N 2/75 (2018.01)
B60N 2/90 (2018.01)

(52) U.S. Cl.
CPC ............ *B60N 2/753* (2018.02); *B60N 2/938* (2018.02); *B60N 2002/952* (2018.02)

(58) Field of Classification Search
CPC ........ B60N 2/752; B60N 2/938; B60N 2/952; A47C 7/543; A47C 7/541
USPC .............................. 297/411.3, 411.32, 411.38
See application file for complete search history.

(56) References Cited

U.S. PATENT DOCUMENTS

| 5,076,645 | A  | * | 12/1991 | Yokota | B60N 2/753 |
| | | | | | 297/411.32 |
| 9,022,463 | B2 | * | 5/2015 | Cha | B60N 2/757 |
| | | | | | 297/411.32 |
| 10,207,612 | B2 | * | 2/2019 | Lee | B60N 2/757 |
| 11,465,539 | B2 | * | 10/2022 | Wang | B60N 2/753 |
| 2004/0140697 | A1 | * | 7/2004 | Yuhki | B60N 2/757 |
| | | | | | 297/113 |

(Continued)

FOREIGN PATENT DOCUMENTS

KR 20140082341 A 7/2014

Primary Examiner — David R Dunn
Assistant Examiner — Jessica Kathryn Thompson
(74) Attorney, Agent, or Firm — SLATER MATSIL, LLP

(57) ABSTRACT

An embodiment armrest assembly for a vehicle includes an armrest rotatably coupled to an armrest board and configured to be extended from the armrest board by rotating forward or to be housed in the armrest board by rotating and standing and a speed-reduction damper mechanism connecting the armrest and the armrest board and configured to make a rotational speed of the armrest uniform by reducing the rotational speed when the armrest rotates to be extended.

15 Claims, 13 Drawing Sheets

(56) References Cited

U.S. PATENT DOCUMENTS

2014/0368017 A1* 12/2014 Girbinger ............. B60N 2/753
   297/411.32
2017/0021749 A1* 1/2017 Ward ...................... B60N 2/79
2021/0370815 A1* 12/2021 Zimmermann ........ B60N 2/919

* cited by examiner

ARMREST ASSEMBLY FOR REAR SEAT OF VEHICLE

CROSS-REFERENCE TO RELATED APPLICATIONS

This application claims the benefit of Korean Patent Application No. 10-2022-0146999, filed on Nov. 7, 2022, which application is hereby incorporated herein by reference.

TECHNICAL FIELD

The present invention relates to an armrest assembly for a rear seat of a vehicle.

BACKGROUND

In general, an armrest may be provided in a second seat (rear seat) in a passenger vehicle, and the passenger seated in the rear seat may use the armrest.

The armrest in the rear seat may be used suitably for its purpose by the passenger when the armrest is rotated forward and extended to protrude. When the armrest is rotated rearward and stands, the armrest is housed and stored in an armrest board.

Because structures for rotating and locking the armrest in the related art are operated by friction between an armrest component and an armrest board component, there are problems in that noise is caused by the friction during an operation, abrasion occurs because of the friction, and the occurrence of abrasion makes it difficult to implement a secure locking structure. In particular, there is a problem in that a non-uniform falling velocity occurs when the armrest is extended, which makes it difficult to implement an impression of high-level quality.

The foregoing explained as the background is intended merely to aid in the understanding of the background of embodiments of the present invention and is not intended to mean that the present invention falls within the purview of the related art that is already known to those skilled in the art.

SUMMARY

The present invention relates to an armrest assembly for a rear seat of a vehicle. Particular embodiments relate to a technology associated with an armrest assembly for a rear seat of a vehicle, which is capable of improving high-level quality by implementing a uniform falling speed when an armrest is extended, the armrest assembly having a novel locking structure capable of more securely fixing the armrest that is extended or housed.

Embodiments of the present invention can solve problems in the art and provide an armrest assembly for a rear seat of a vehicle that implements a rotation of an armrest by using a speed-reduction damper mechanism using a gas spring, the armrest assembly being capable of improving high-level quality by implementing a uniform falling speed when the armrest is extended and of preventing operational noise and improving durability.

Embodiments of the present invention also provide an armrest assembly for a rear seat of a vehicle, which has a locking structure capable of more securely fixing an armrest that is extended or housed.

Embodiments of the present invention provide an armrest assembly for a rear seat of a vehicle, the armrest assembly including an armrest rotatably coupled to an armrest board and configured to be extended from the armrest board by rotating forward or to be housed in the armrest board by rotating and standing and a speed-reduction damper mechanism installed to connect the armrest and the armrest board and configured to make a rotational speed of the armrest uniform by reducing the rotational speed when the armrest rotates to be extended.

The armrest may include an upper part having an armrest lid and a lower part having an accommodation space therein, and the speed-reduction damper mechanism may be installed and positioned in the accommodation space of the lower part.

The speed-reduction damper mechanism may include a gas spring positioned in an accommodation space in the armrest, disposed in a longitudinal direction of the armrest, and having one end coupled to the armrest, a hinge pin fixed to a hinge bracket of the armrest board and coupled to the other end of the gas spring, and a hinge bushing fitted with the hinge pin and configured to enable the armrest to rotate.

The speed-reduction damper mechanism may be provided as a pair of speed-reduction damper mechanisms disposed at left and right sides in an accommodation space in the armrest.

The armrest assembly may further include a knob rotatably coupled to the armrest and configured to be manipulated by a user and a locking mechanism installed in the armrest and connected to the knob by means of a wire, the locking mechanism being configured to lock the armrest by connecting the armrest to hinge brackets of the armrest board when the user does not manipulate the knob or to unlock the armrest by disconnecting the armrest and the hinge brackets when the user manipulates the knob.

The armrest may include an upper part having an armrest lid and a lower part having an accommodation space therein, the knob may be rotatably coupled to the lower part by means of a knob spring, and the locking mechanism may be disposed in the accommodation space of the lower part while extending leftward and rightward.

The locking mechanism may include a rotary bracket positioned in an accommodation space in the armrest, connected to the wire, and configured to rotate when the wire is pulled or released, left and right pin holders coupled to the rotary bracket, extending in opposite leftward/rightward directions, and configured to rotate together with the rotary bracket, and left and right locking pins respectively coupled to the left and right pin holders and configured to lock the armrest while being kept simultaneously penetrating left and right surfaces of the armrest and the hinge brackets when the user does not manipulate the knob or to unlock the armrest by disconnecting the armrest and the hinge brackets while separating from the hinge brackets when the user manipulates the knob.

The locking mechanism may further include a locking pin housing fixed to the armrest and configured such that the left and right locking pins are inserted into the locking pin housing while extending leftward and rightward and a rotary cap and a screw configured to fix the rotary bracket to the locking pin housing so that the rotary bracket is rotatable.

The locking mechanism may further include a locking pin bushing installed in the locking pin housing while extending leftward and rightward and configured such that the left and right locking pins are inserted into the locking pin bushing while extending in a longitudinal direction, the locking pin bushing being configured to guide rectilinear movements of the left and right locking pins.

The locking mechanism may further include a locking pin spring positioned in the locking pin housing and having two opposite ends supported by the left and right locking pins, the locking pin spring being configured to provide an elastic force in a direction in which the left and right locking pins move away from each other.

In addition, embodiments of the present invention provide an armrest assembly for a rear seat of a vehicle, the armrest assembly including an armrest rotatably coupled to an armrest board and configured to be extended from the armrest board by rotating forward or to be housed in the armrest board by rotating and standing, a knob rotatably coupled to the armrest and configured to be manipulated by a user, and a locking mechanism installed in the armrest and connected to the knob by means of a wire, the locking mechanism being configured to lock the armrest by connecting the armrest to hinge brackets of the armrest board when the user does not manipulate the knob or unlock the armrest by disconnecting the armrest and the hinge brackets when the user manipulates the knob.

The locking mechanism may include a rotary bracket positioned in an accommodation space in the armrest, connected to the wire, and configured to rotate when the wire is pulled or released, left and right pin holders coupled to the rotary bracket, extending in opposite leftward/rightward directions, and configured to rotate together with the rotary bracket, and left and right locking pins respectively coupled to the left and right pin holders and configured to lock the armrest while being kept simultaneously penetrating left and right surfaces of the armrest and the hinge brackets when the user does not manipulate the knob or unlock the armrest by disconnecting the armrest and the hinge brackets while separating from the hinge brackets when the user manipulates the knob.

The locking mechanism may further include a locking pin housing fixed to the armrest and configured such that the left and right locking pins are inserted into the locking pin housing while extending leftward and rightward and a rotary cap and a screw configured to fix the rotary bracket to the locking pin housing so that the rotary bracket is rotatable.

The locking mechanism may further include a locking pin bushing installed in the locking pin housing while extending leftward and rightward and configured such that the left and right locking pins are inserted into the locking pin bushing while extending in a longitudinal direction, the locking pin bushing being configured to guide rectilinear movements of the left and right locking pins.

The locking mechanism may further include a locking pin spring positioned in the locking pin housing and having two opposite ends supported by the left and right locking pins, the locking pin spring being configured to provide an elastic force in a direction in which the left and right locking pins move away from each other.

The armrest assembly for a rear seat of a vehicle according to embodiments of the present invention implements the rotation of the armrest by using the speed-reduction damper mechanism using the gas spring. When the armrest is rotated to be extended, the gas spring may make a rotational speed of the armrest uniform by reducing the rotational speed. Therefore, a uniform falling speed may be implemented when the armrest is extended, which makes it possible to improve high-level quality, prevent operational noise, and improve durability.

In addition, according to embodiments of the present invention, the restrictive forces of the left and right locking pins, which rectilinearly move when the user manipulates the knob, more securely lock the extended or housed armrest. Therefore, it is possible to further increase the restrictive force applied to the armrest, thereby preventing the rattling of the armrest and improving durability of the armrest.

DETAILED DESCRIPTION OF ILLUSTRATIVE EMBODIMENTS

Figure 1:
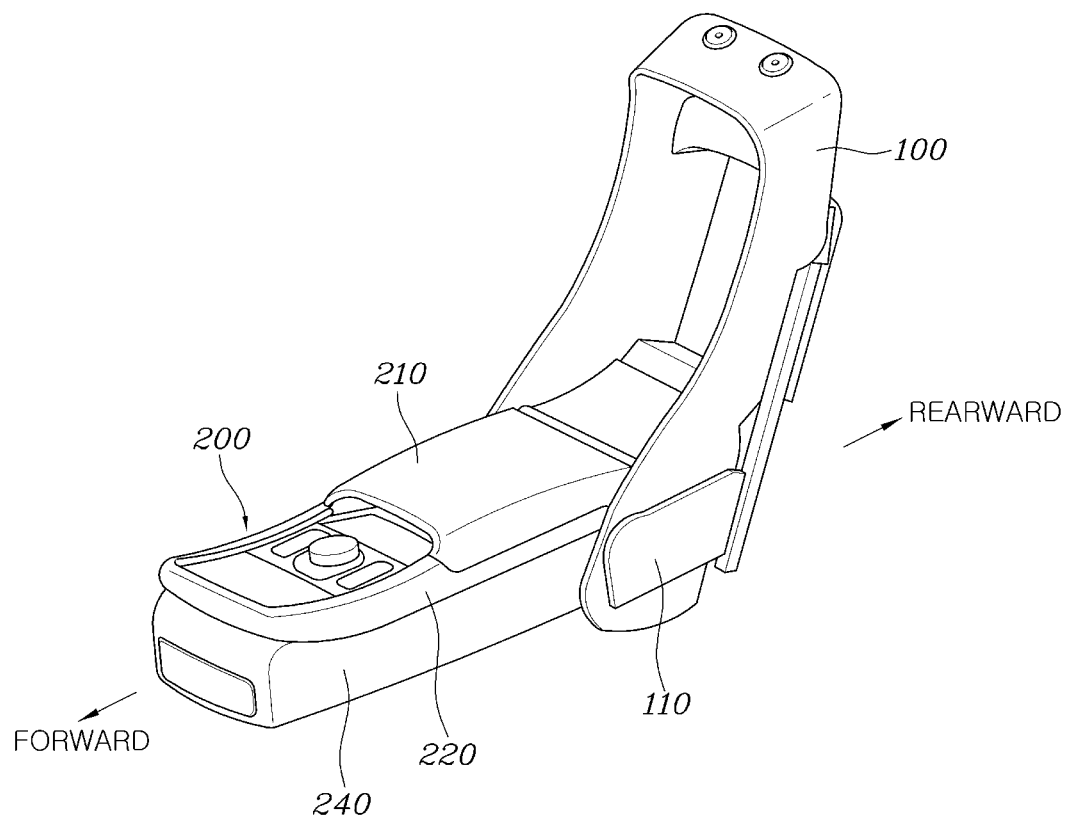
FIG. 1 is a view illustrating a state in which an armrest of an armrest assembly for a rear seat of a vehicle according to embodiments of the present invention is extended.

Hereinafter, embodiments disclosed in the present specification will be described in detail with reference to the accompanying drawings. The same or similar constituent elements are assigned with the same reference numerals, and the repetitive description thereof will be omitted.

The suffixes "module", "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification.

In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" included in the name of "motor control unit (MCU)" or "hybrid control unit (HCU)" is merely a term widely used to name a control device (controller or control unit) for controlling a particular vehicle function but does not mean a generic function unit.

The control unit (controller) may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an armrest assembly for a rear seat of a vehicle according to an exemplary embodiment of the present invention will be described with reference to the accompanying drawings.

As illustrated in FIGS. 1 to 13, the armrest assembly for a rear seat of a vehicle according to embodiments of the present invention includes an armrest 200 rotatably coupled to an armrest board 100 and configured to be extended from the armrest board 100 by rotating forward or to be housed in the armrest board 100 by rotating and standing and a speed-reduction damper mechanism 300 installed to connect the armrest 200 and the armrest board 100 and configured to make a rotational speed of the armrest 200 uniform by reducing the rotational speed when the armrest 200 rotates to be extended.

A general rear seat for a passenger vehicle includes a left seat and a right seat. The armrest 200 is provided between the left seat and the right seat. A passenger seated in the rear seat rotates the armrest 200 forward to use the armrest 200.

The armrest board 100 is fixed to a frame of the rear seat. One end of the armrest 200 is rotatably and hingedly coupled to the armrest board 100.

Figure 2:
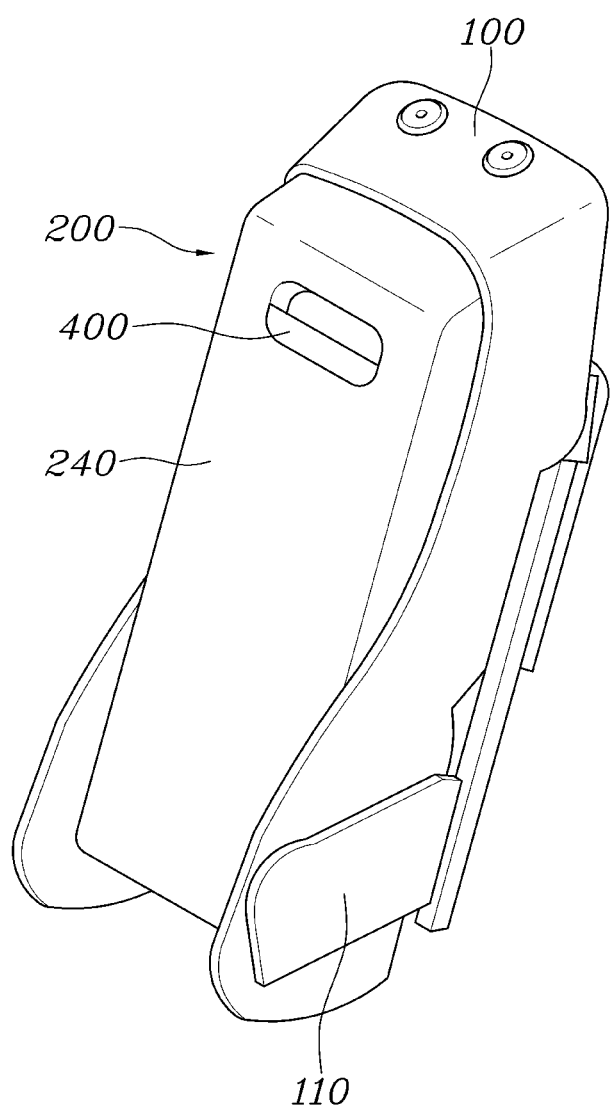
FIG. 2 is a view illustrating a state in which the armrest is housed in an armrest board.
Figure 3:
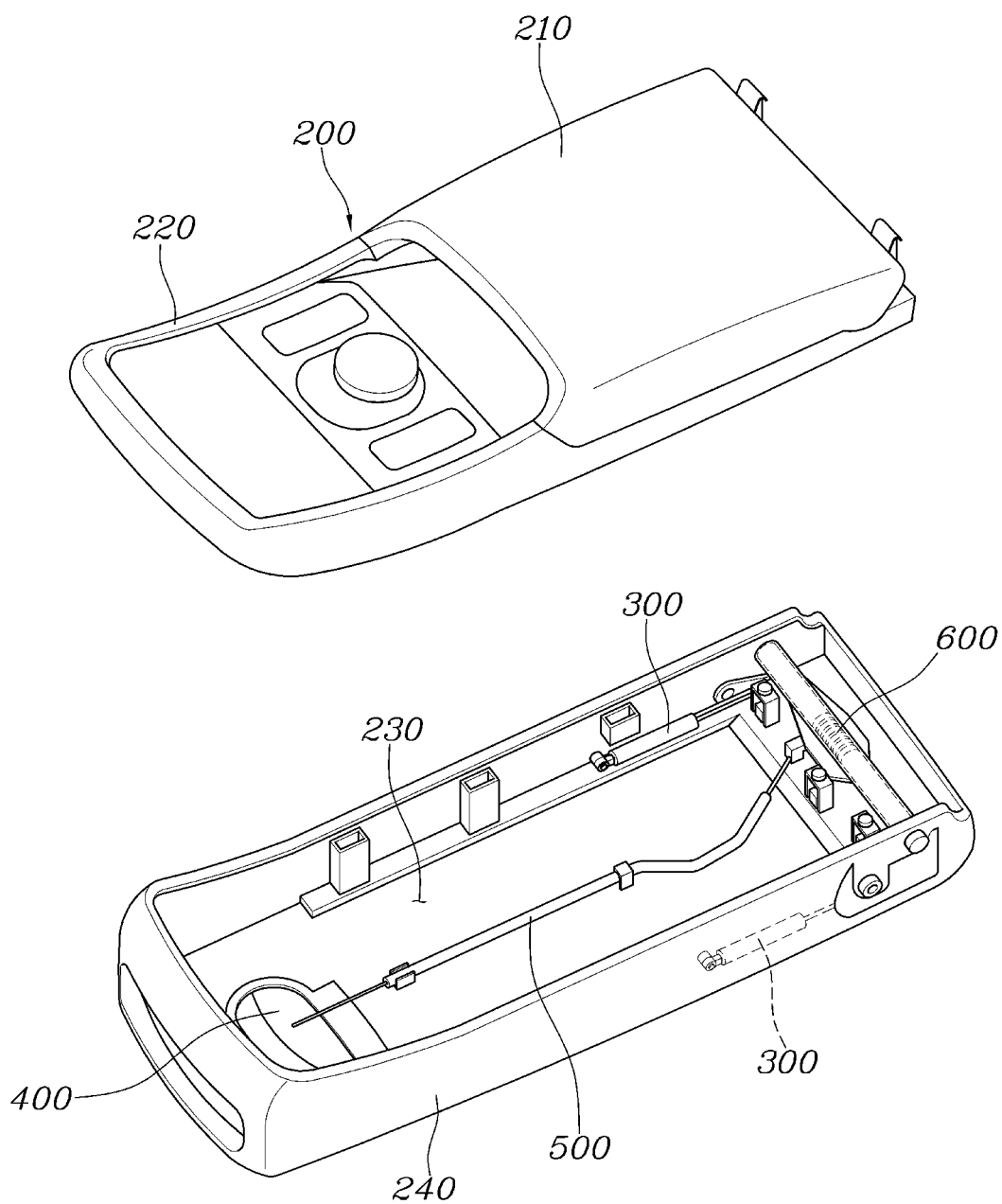
FIG. 3 is an exploded view illustrating an upper part and a lower part of the armrest.
Figure 4:
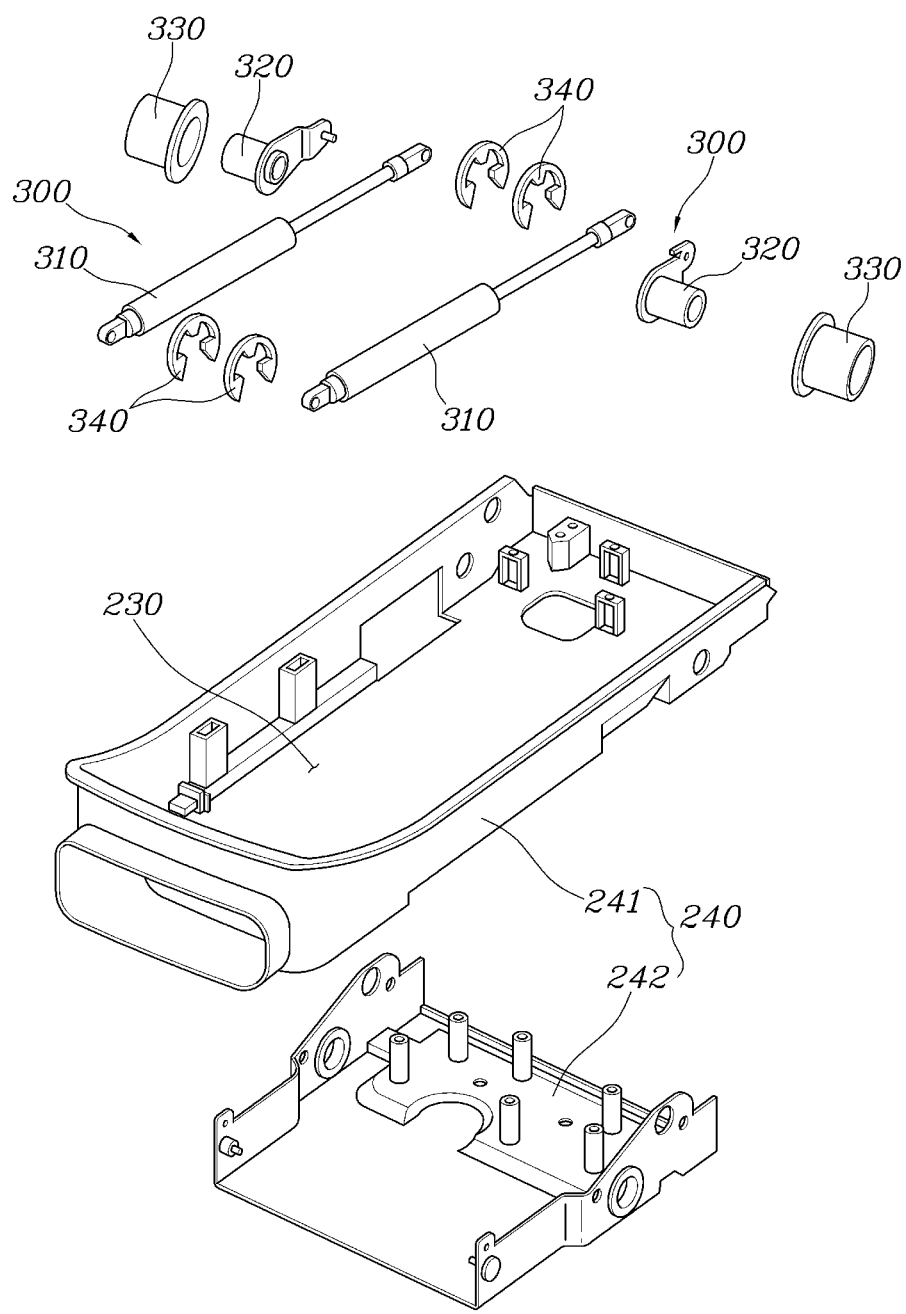
FIG. 4 is a view for explaining a speed-reduction damper mechanism according to embodiments of the present invention.
Figure 5:
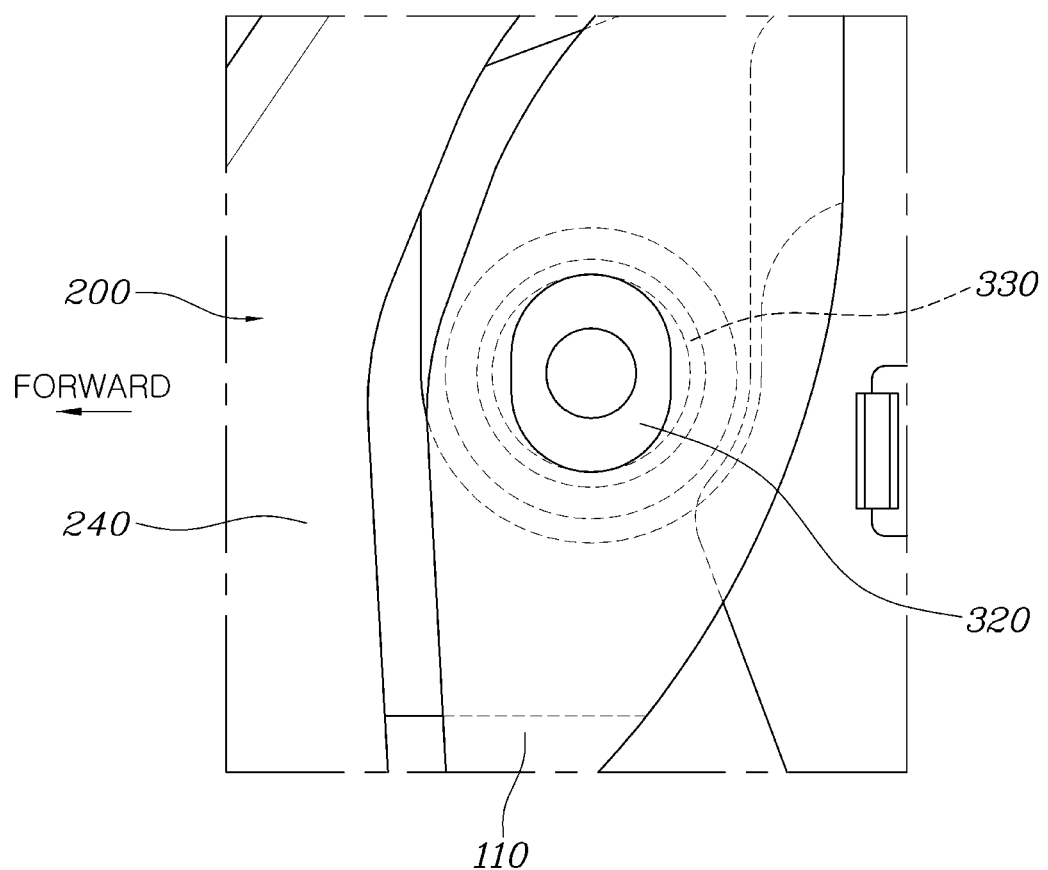
FIG. 5 is a view illustrating a portion where the speed-reduction damper mechanism is installed when viewed from a lateral side of a hinge bracket.

As illustrated in FIG. 1, the user may rotate the armrest 200 of the rear seat forward relative to the armrest board 100 so that the armrest 200 is extended and protrudes, and then the passenger may use the armrest 200 for suitable purposes by supporting the passenger's arm on the armrest 200. As illustrated in FIG. 2, when the user rotates the armrest 200 rearward and stands the armrest 200, the armrest 200 is housed and stored in the armrest board 100.

The armrest 200 includes an upper part 220 having an armrest lid 210 and a lower part 240 having an accommodation space 230 therein.

The speed-reduction damper mechanism 300 is positioned and installed in the accommodation space 230 of the lower part 240 that constitutes the armrest 200. Therefore, the speed-reduction damper mechanism 300 is not exposed to the outside, such that an external aesthetic appearance may be implemented.

Two speed-reduction damper mechanisms 300 are provided to implement a smooth rotational operation of the armrest 200. The two speed-reduction damper mechanisms 300 are respectively installed at left and right sides of a rear portion of the accommodation space 230 of the lower part 240 and extend forward and rearward.

The speed-reduction damper mechanisms 300 are respectively provided at the left and right sides of the rear portion of the accommodation space 230 and installed in a longitudinal direction of the armrest 200, which makes it possible to minimize an installation space for the armrest 200.

The speed-reduction damper mechanisms 300 each include a gas spring 310 positioned in the accommodation space 230 in the armrest 200, disposed in the longitudinal direction of the armrest 200, and having one end coupled to the armrest 200, a hinge pin 320 fixed to a hinge bracket no of the armrest board 100 and coupled to the other end of the gas spring 310, and a hinge bushing 330 fitted with the hinge pin 320 and configured to enable the rotation of the armrest 200. The two opposite ends of the gas spring 310 are fixed to fixing rings 340 each having an 'E' shape.

The speed-reduction damper mechanism 300 is positioned and installed in the accommodation space 230 in the lower part 240 that constitutes the armrest 200.

The lower part 240 of the armrest 200 includes a box frame 241 made of a plastic material and configured to define the accommodation space 230 and a cover frame 242 made of a steel material and configured to reinforce the box frame 231 while partially surrounding a bottom surface of the box frame 231.

The gas spring 310 includes a cylinder having an interior filled with gas and a rod configured to move along the cylinder. An overall length of the gas spring 310 varies depending on the movement of the rod.

One end of the cylinder is rotatably coupled to the cover frame 242 by means of the E-shaped fixing ring 340, and the cover frame 242 is made of a steel material and constitutes the lower part 240 of the armrest 200.

The hinge pin 320 is a component that fastens the armrest 200 to the hinge bracket 110 of the armrest board 100.

The hinge pin 320 includes a portion disposed in the accommodation space 230 and coupled to one end of the rod of the gas spring 310 by means of the E-shaped fixing ring 340 and a portion fixed to the hinge bracket 110 of the armrest board 100 while penetrating a lateral surface of the lower part 240 of the armrest 200.

The hinge brackets no are provided at two opposite sides of a lower end of the armrest board 100 and rotation center parts of the armrest 200 are coupled to the hinge brackets 110.

The portion of the hinge pin 320, which is fixed to the hinge bracket no while penetrating the lateral surface of the lower part 240, has an elliptical cross-section, such that the hinge pin 320 is fixed to the hinge bracket no without rotating even though the armrest 200 rotates.

The hinge bushing 330 is fitted with the portion of the hinge pin 320 that penetrates the lateral surface of the lower part 240. The hinge bushing 330 is in contact with the lower part 240 and serves to enable the armrest 200 to rotate.

Figure 6:
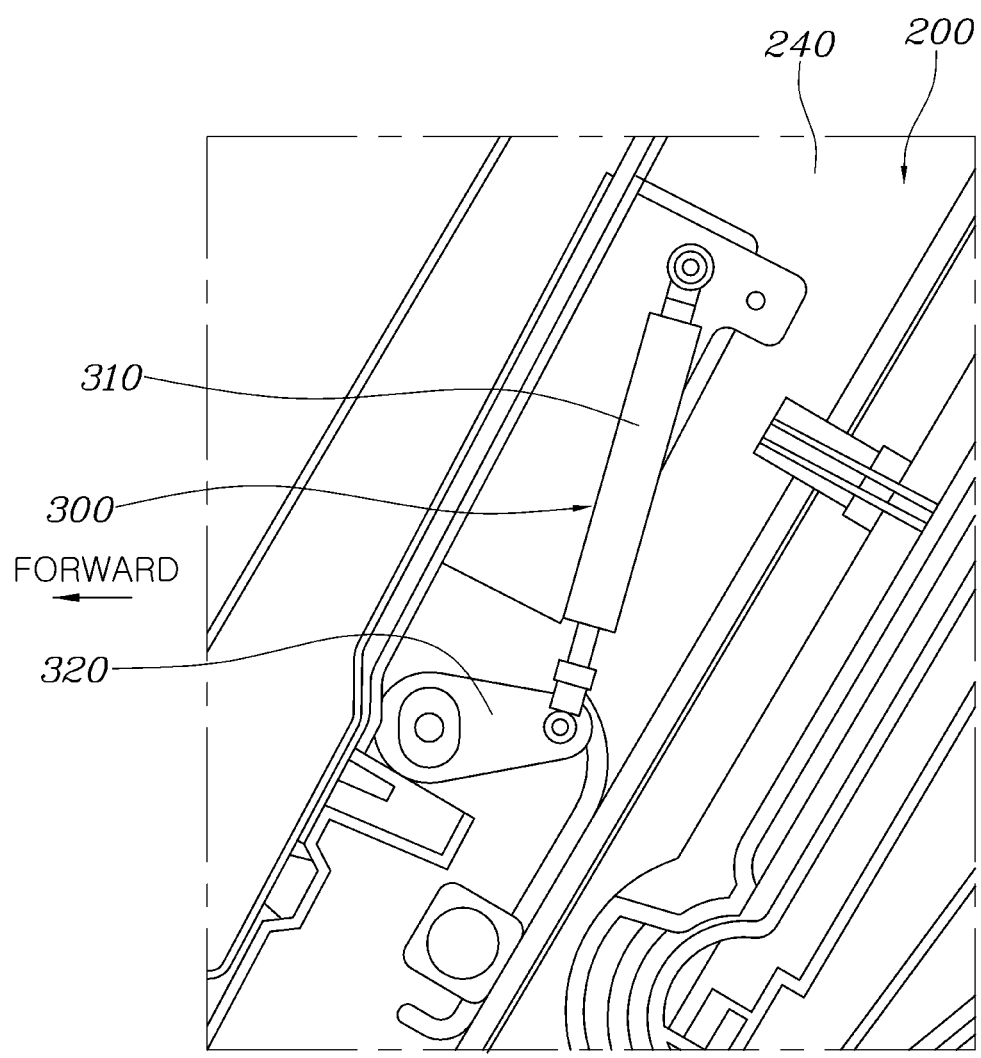
FIG. 6 is a view illustrating a state in which a gas spring is compressed in length in a state in which the armrest is housed.
Figure 7:
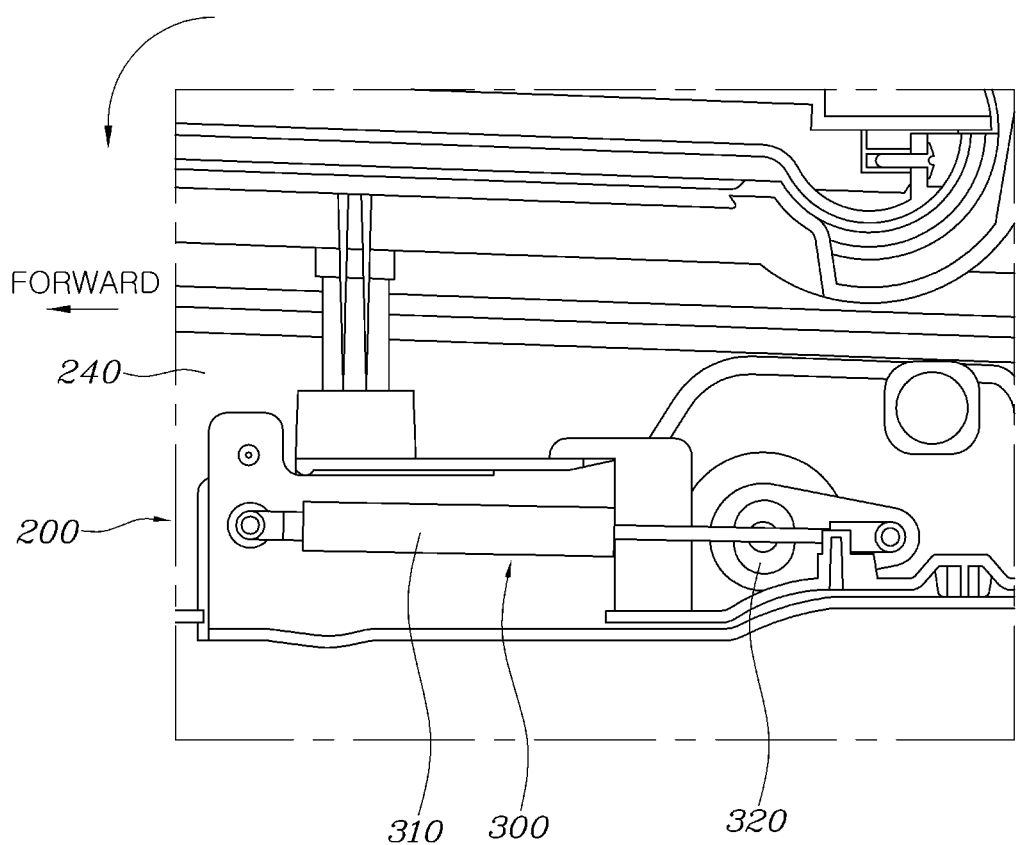
FIG. 7 is a view illustrating a state in which the gas spring is extended in length in a state in which the armrest is extended.
Figure 8:
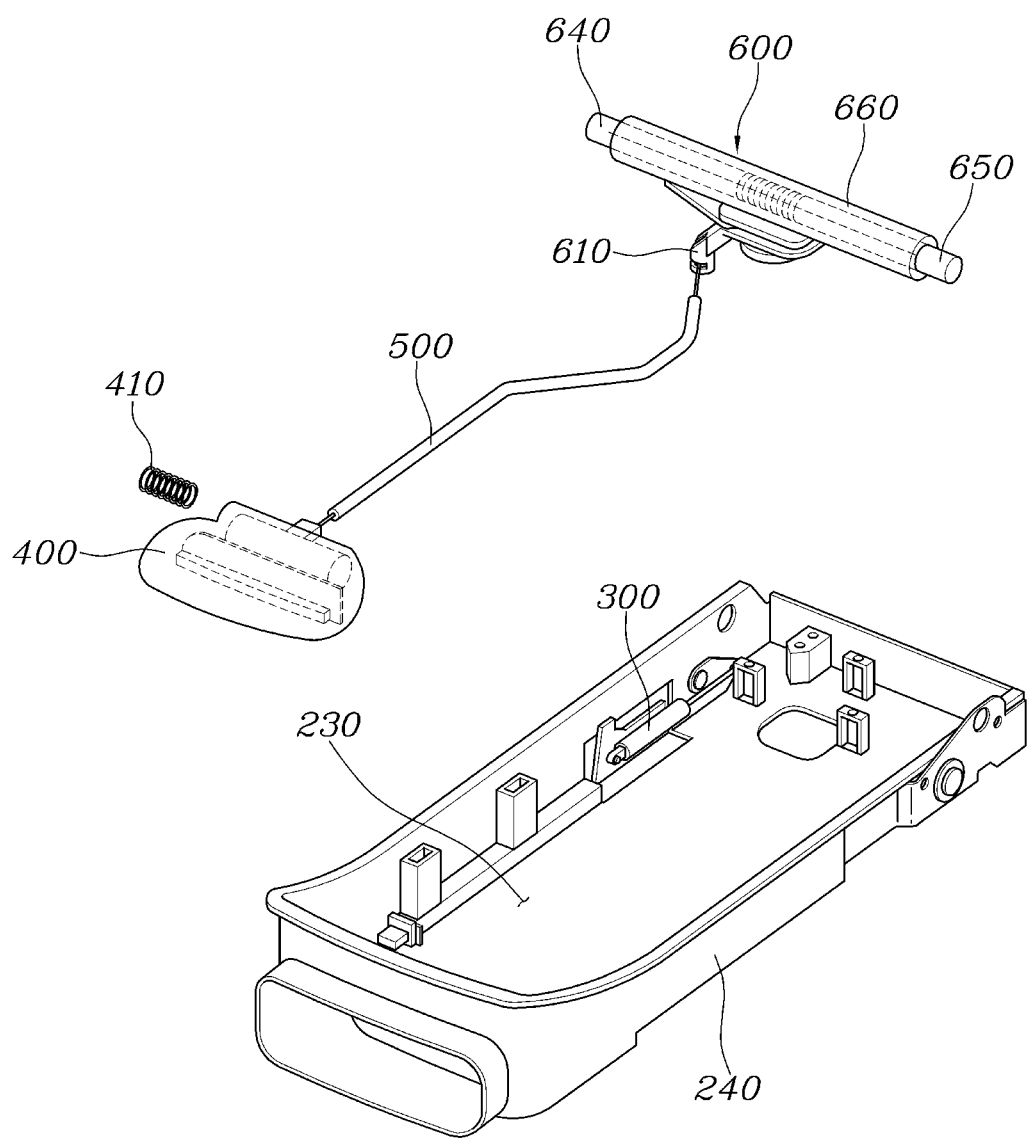
FIG. 8 is a view for explaining a knob and a locking mechanism according to embodiments of the present invention.
Figure 9:
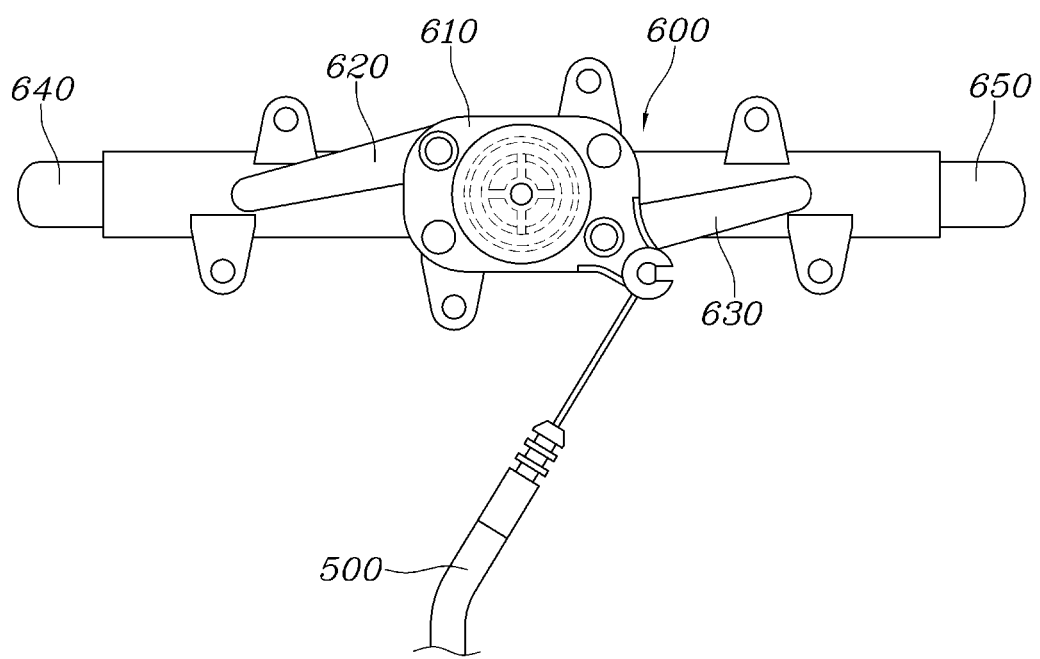
FIG. 9 is a top plan view of the locking mechanism.
Figure 10:
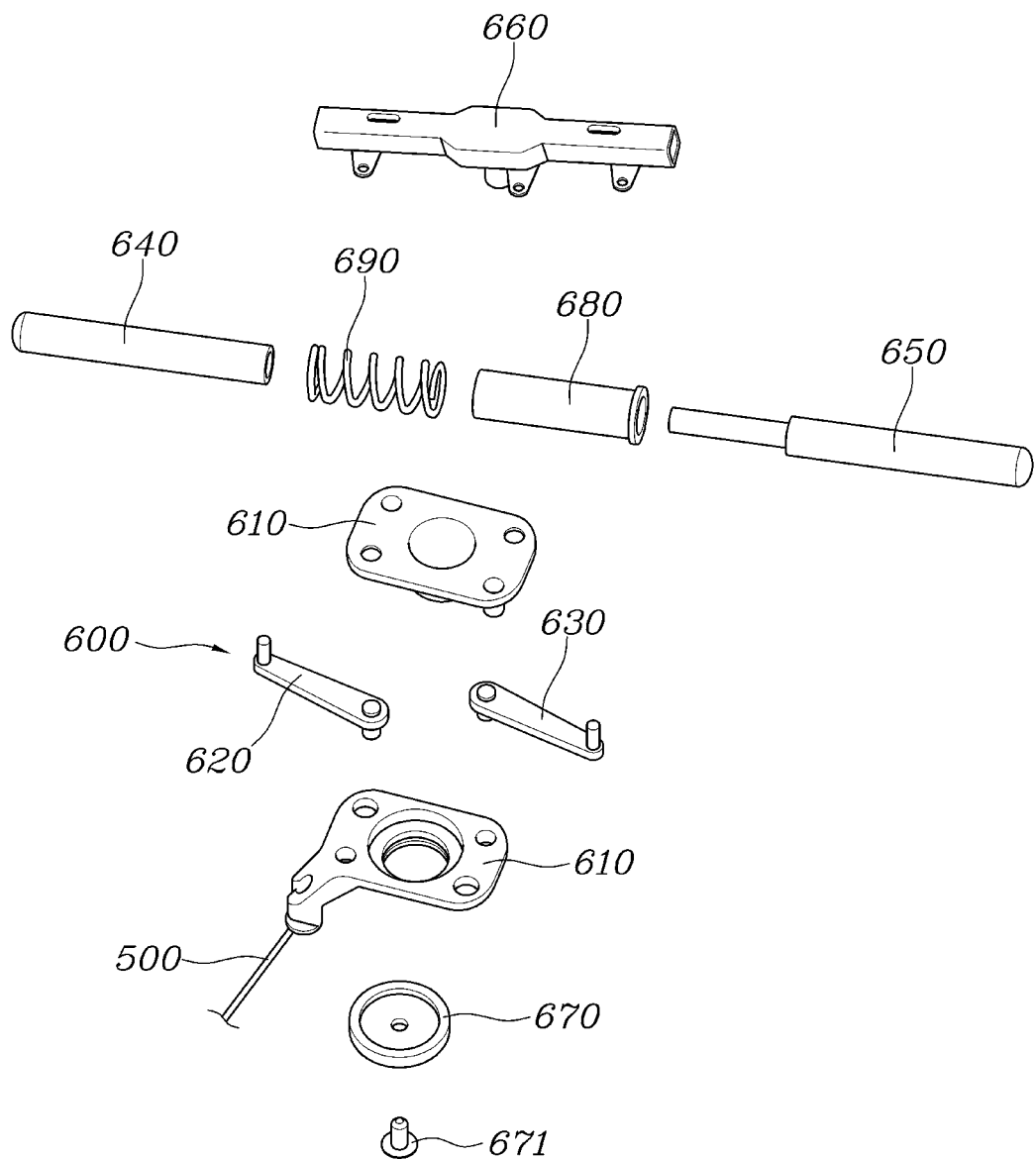
FIG. 10 is an exploded view of the locking mechanism.

FIG. 6 illustrates a state in which the gas spring 310 is compressed in length in the state in which the armrest 200 is housed in the armrest board 100, and FIG. 7 illustrates a state in which the gas spring 310 is extended in length in the state in which the armrest 200 is rotated forward and extended.

The length of the gas spring 310 varies when the armrest 200 rotates. In particular, when the armrest 200 is rotated to be extended, the gas spring 310 may make a rotational speed of the armrest 200 uniform by reducing the rotational speed. Therefore, a uniform falling speed may be implemented when the armrest 200 is extended, which makes it possible to improve high-level quality, prevent operational noise, and improve durability.

The armrest assembly according to embodiments of the present invention further includes a knob 400 rotatably coupled to the armrest 200 and configured to be manipulated by a user and a locking mechanism 600 installed in the armrest 200 and connected to the knob 400 by means of a wire 500, the locking mechanism 600 being configured to lock the armrest 200 by connecting the armrest 200 to the hinge brackets no of the armrest board 100 when the user does not manipulate the knob 400 or to unlock the armrest 200 by disconnecting the armrest 200 and the hinge brackets no when the user manipulates the knob 400.

The knob 400 is rotatably installed on the lower part 240 of the armrest 200 by means of a knob spring 410.

The knob 400 is installed to be exposed to the outside while penetrating the lower part 240 of the armrest 200. The passenger may use the knob 400 by rotating the knob 400. When an operating force applied to the knob 400 by the passenger is eliminated from the knob 400, the rotated knob 400 is returned to an initial position by the knob spring 410.

The wire 500 and the locking mechanism 600 are positioned and installed in the accommodation space 230 of the lower pall 240 that constitutes the armrest 200. The knob 400 and the locking mechanism 600 are respectively positioned at one end and the other end of the lower part 240 and spaced apart from each other. The wire 500 connects the knob 400 and the locking mechanism 600.

The locking mechanism 600 is disposed at a position adjacent to a hinge part of the armrest 200 and extends toward left and right sides of the accommodation space 230.

The locking mechanism 600 includes a rotary bracket 610 positioned in the accommodation space 230 in the armrest 200, connected to the wire 500, and configured to rotate when the wire 500 is pulled or released, left and right pin holders 620 and 630 coupled to the rotary bracket 610, extending in opposite leftward/rightward directions, and configured to rotate together with the rotary bracket 610, and left and right locking pins 640 and 650 respectively coupled to the left and right pin holders 620 and 630 and configured to lock the armrest 200 while being kept simultaneously penetrating left and right surfaces of the armrest 200 and the hinge brackets no when the user does not manipulate the knob 400 or to unlock the armrest 200 by disconnecting the armrest 200 and the hinge brackets no while separating from the hinge brackets no when the user manipulates the knob 400.

The wire 500 is pulled when the knob 400 is rotated as the user manipulates the knob 400. When the user eliminates the operating force from the knob 400, the knob 400 is returned by an elastic force of the knob spring 410, and the pulled wire 500 is released.

The rotary bracket 610 rotates when the wire 500 is pulled or released. When the rotary bracket 610 rotates, the left and right pin holders 620 and 630 rotate together. When the left and right pin holders 620 and 630 rotate, the left and right locking pins 640 and 650 rectilinearly move leftward and rightward, respectively.

Figure 11:
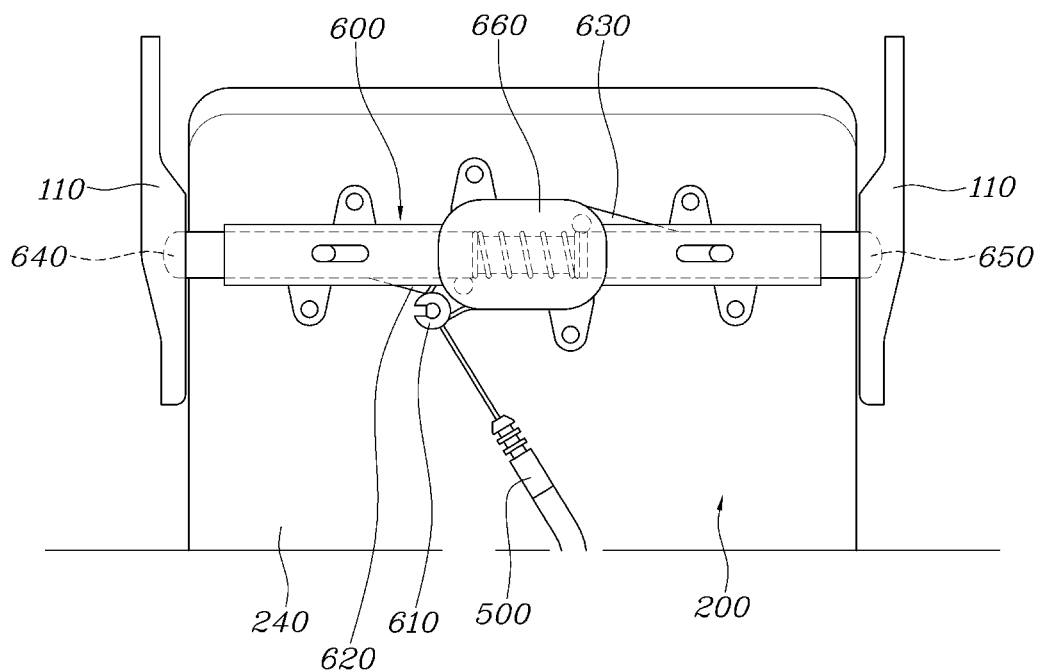
FIG. 11 is a view for explaining a state in which the armrest is locked when the knob is not manipulated.

FIG. 11 is a view for explaining a state in which the armrest 200 is locked when the user does not manipulate the knob 400.

No force is transmitted through the wire 500 when the user does not manipulate the knob 400, such that the left and right locking pins 640 and 650 are kept simultaneously penetrating the left and right surfaces of the armrest 200 and the hinge brackets no. In this case, the armrest 200 is kept in a locked state in which the locking forces of the left and right locking pins 640 and 650 make it impossible to rotate the armrest 200.

Figure 12:
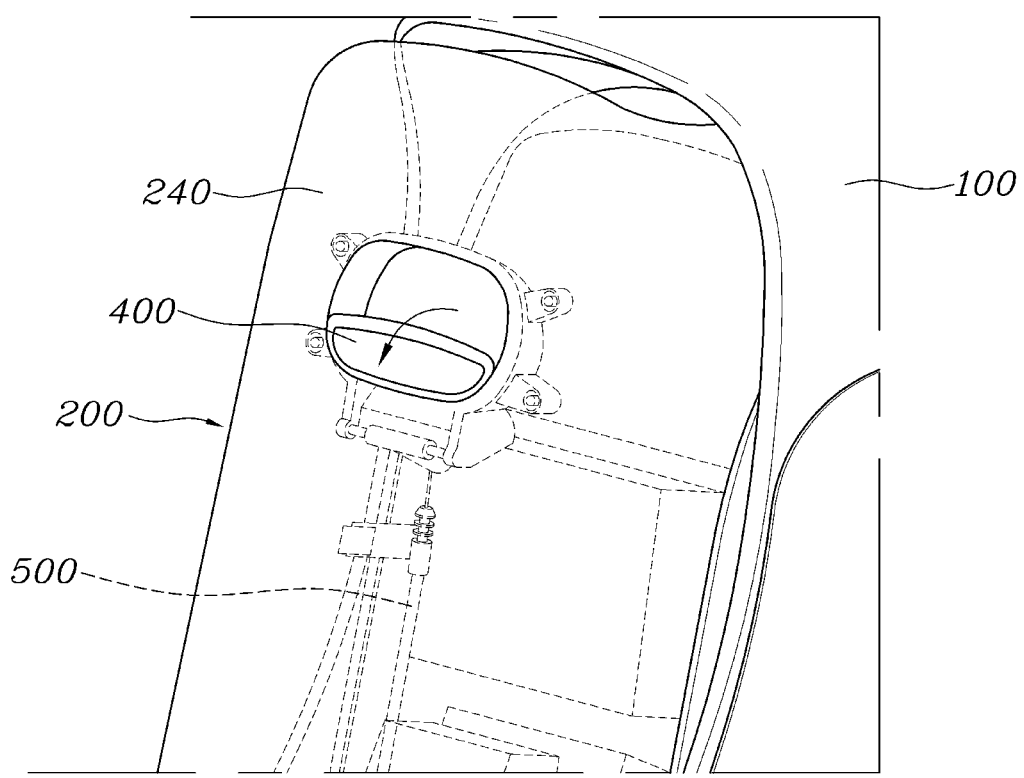
FIGS. 12 and 13 are views for explaining a state in which the armrest is unlocked when the knob is manipulated.
Figure 13:
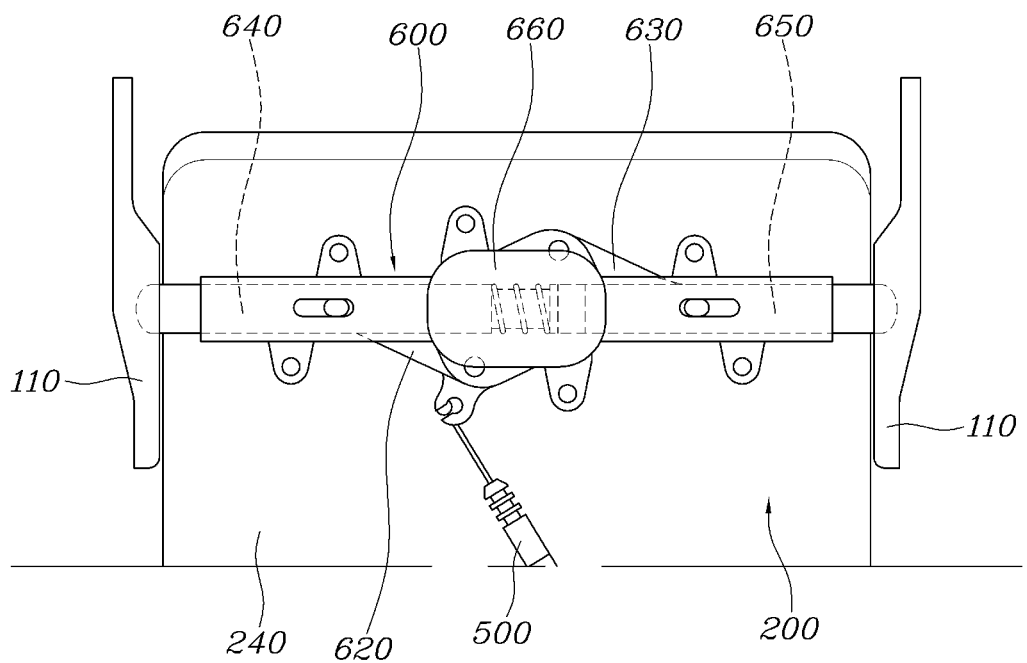

FIG. 12 illustrates a state in which the user manipulates and rotates the knob 400 in the arrow direction, and FIG. 13 is a view for explaining a state in which the armrest 200 is unlocked by the rotation of the knob 400.

When the user manipulates and rotates the knob 400 in the state in which the armrest 200 is locked, the rotary bracket 610 rotates as the wire 500 is pulled. When the rotary bracket 610 rotates, the left and right pin holders 620 and 630 rotate together. When the left and right pin holders 620 and 630 rotate, the left locking pin 640 rectilinearly moves rightward, and the right locking pin 650 rectilinearly moves leftward, such that an interval between the left and right locking pins decreases.

Both the left and right locking pins 640 and 650 separate from the hinge brackets no as the left and right locking pins 640 and 650 move, such that the armrest 200 and the hinge brackets no are disconnected. In this case, the armrest 200 is unlocked, such that the armrest 200 is in the unlocked state in which the armrest 200 may rotate.

In an embodiment according to the present invention, the armrest 200 is locked by restrictive forces of the left and right locking pins 640 and 650 that rectilinearly move when the knob 400 operates. Therefore, it is possible to more securely fix the extended or housed armrest 200 by the restrictive force.

As illustrated, the rotary bracket 610 may be configured by the two components, i.e., upper and lower parts, or configured by a single component.

The locking mechanism 600 according to embodiments of the present invention further includes a locking pin housing 660 fixed to the armrest 200 and configured such that the left and right locking pins 640 and 650 are inserted into the locking pin housing 660 while extending leftward and rightward, a rotary cap 670 and a screw 671 configured to fix the rotary bracket 610 to the locking pin housing 660 so that the rotary bracket 610 is rotatable, a locking pin bushing 680 installed in the locking pin housing 660 while extending leftward and rightward and configured such that the left and right locking pins 640 and 650 are inserted into the locking pin bushing 680 while extending in the longitudinal direction, the locking pin bushing 680 being configured to guide the rectilinear movements of the left and right locking pins 640 and 650, and a locking pin spring 690 positioned in the locking pin housing 660 and having two opposite ends respectively supported by the left and right locking pins 640 and 650, the locking pin spring 690 being configured to provide an elastic force in a direction in which the left and right locking pins 640 and 650 move away from each other.

The locking pin housing 660 is positioned in the accommodation space 230 in the lower part 240 and fixedly installed on the lower part 240 by means of a plurality of coupling members (screws).

The locking pin housing 660 is provided in the form of a hollow pipe, and two opposite ends of the locking pin housing 660 extend leftward and rightward. The locking pin bushing 680, the locking pin spring 690, and the left and right locking pins 640 and 650 are installed in the locking pin housing 660 while extending leftward and rightward.

In addition, the armrest assembly for a rear seat of a vehicle according to embodiments of the present invention includes the armrest 200 rotatably coupled to the armrest board 100 and configured to be extended from the armrest board 100 by rotating forward or to be housed in the armrest board 100 by rotating and standing, the knob 400 rotatably coupled to the armrest 200 and configured to be manipulated by a user, and the locking mechanism 600 installed in the armrest 200 and connected to the knob 400 by means of the wire 500, the locking mechanism 600 being configured to lock the armrest 200 by connecting the armrest 200 to the hinge brackets no of the armrest board 100 when the user does not manipulate the knob 400 or unlock the armrest 200 by disconnecting the armrest 200 and the hinge brackets no when the user manipulates the knob 400.

As described above, the armrest assembly for a rear seat of a vehicle according to embodiments of the present invention implements the rotation of the armrest 200 by using the speed-reduction damper mechanism 300 using the gas spring 310. When the armrest 200 is rotated to be extended, the gas spring 310 may make a rotational speed of the armrest 200 uniform by reducing the rotational speed. Therefore, a uniform falling speed may be implemented when the armrest 200 is extended, which makes it possible to improve high-level quality, prevent operational noise, and improve durability.

In addition, according to embodiments of the present invention, the restrictive forces of the left and right locking pins 640 and 650, which rectilinearly move when the user manipulates the knob 400, more securely lock the extended or housed armrest 200. Therefore, it is possible to further increase the restrictive force applied to the armrest 200, thereby preventing the rattling of the armrest 200 and improving durability of the armrest 200.

While the specific embodiments of the present invention have been illustrated and described, it will be obvious to those skilled in the art that the present invention may be variously modified and changed without departing from the technical spirit of the present invention defined in the appended claims.

What is claimed is:

1. An armrest assembly for a vehicle, the armrest assembly comprising:
    an armrest rotatably coupled to an armrest board and configured to be extended from the armrest board by rotating forward or to be housed in the armrest board by rotating and standing;
    a speed-reduction damper mechanism connecting the armrest and the armrest board and configured to make a rotational speed of the armrest uniform by reducing the rotational speed when the armrest rotates to be extended; and
    a knob rotatably coupled to the armrest and configured to be manipulated by a user; and
    a locking mechanism installed in the armrest and connected to the knob by a wire, the locking mechanism being configured to:
        lock the armrest by connecting the armrest to hinge brackets of the armrest board when there is no manipulation of the knob by the user; and
        unlock the armrest by disconnecting the armrest and the hinge brackets in response to a manipulation of the knob by the user, wherein:
    the armrest comprises:
        an upper part having an armrest lid; and
        a lower part having an accommodation space therein;
    the knob is rotatably coupled to the lower part by a knob spring; and
    the locking mechanism is disposed in the accommodation space of the lower part and extends leftward and rightward.

2. The armrest assembly of claim 1, wherein the speed-reduction damper mechanism is installed and positioned in the accommodation space of the lower part.

3. The armrest assembly of claim 1, wherein the speed-reduction damper mechanism comprises:
    a gas spring positioned in the accommodation space in the armrest, disposed in a longitudinal direction of the armrest, and having a first end coupled to the armrest;
    a hinge pin fixed to a hinge bracket of the hinge brackets of the armrest board and coupled to a second end of the gas spring; and
    a hinge bushing fitted with the hinge pin and configured to enable the armrest to rotate.

4. The armrest assembly of claim 1, wherein the speed-reduction damper mechanism is provided as a pair of speed-reduction damper mechanisms disposed at left and right sides in the accommodation space in the armrest.

5. The armrest assembly of claim 1, wherein the locking mechanism comprises:
    a rotary bracket positioned in the accommodation space in the armrest, connected to the wire, and configured to rotate based on whether the wire is pulled or released;
    left and right pin holders coupled to the rotary bracket, extending in opposite leftward/rightward directions, and configured to rotate together with the rotary bracket; and
    left and right locking pins respectively coupled to the left and right pin holders and configured to:
        lock the armrest while being kept simultaneously penetrating left and right surfaces of the armrest and the hinge brackets when there is no manipulation of the knob by the user; and
        unlock the armrest by disconnecting the armrest and the hinge brackets while separating from the hinge brackets in response to the manipulation of the knob by the user.

6. The armrest assembly of claim 5, wherein the locking mechanism further comprises:
    a locking pin housing fixed to the armrest and configured such that the left and right locking pins are inserted into the locking pin housing while extending leftward and rightward; and
    a rotary cap and a screw configured to fix the rotary bracket to the locking pin housing so that the rotary bracket is rotatable.

7. The armrest assembly of claim 6, wherein the locking mechanism further comprises a locking pin bushing installed in the locking pin housing while extending leftward and rightward and configured such that the left and right locking pins are inserted into the locking pin bushing while extending in a longitudinal direction, the locking pin bushing being configured to guide rectilinear movements of the left and right locking pins.

8. The armrest assembly of claim 6, wherein the locking mechanism further comprises a locking pin spring positioned in the locking pin housing and having two opposite ends supported by the left and right locking pins, the locking pin spring being configured to provide an elastic force in a direction in which the left and right locking pins move away from each other.

9. An armrest assembly for a vehicle, the armrest assembly comprising:
  an armrest rotatably coupled to an armrest board and configured to be extended from the armrest board by rotating forward or to be housed in the armrest board by rotating and standing;
  a knob rotatably coupled to the armrest and configured to be manipulated by a user; and
  a locking mechanism installed in the armrest and connected to the knob by a wire, the locking mechanism being configured to:
    lock the armrest by connecting the armrest to hinge brackets of the armrest board when there is no manipulation of the knob by the user; and
    unlock the armrest by disconnecting the armrest and the hinge brackets in response to a manipulation of the knob by the user, wherein the locking mechanism comprises:
  a rotary bracket positioned in an accommodation space in the armrest, connected to the wire, and configured to rotate based on whether the wire is pulled or released;
  left and right pin holders coupled to the rotary bracket, extending in opposite leftward/rightward directions, and configured to rotate together with the rotary bracket; and
  left and right locking pins respectively coupled to the left and right pin holders and configured to:
    lock the armrest while being kept simultaneously penetrating left and right surfaces of the armrest and the hinge brackets when there is no manipulation of the knob by the user; and
    unlock the armrest by disconnecting the armrest and the hinge brackets while separating from the hinge brackets in response to the manipulation of the knob by the user.

10. The armrest assembly of claim 9, wherein the locking mechanism further comprises:
  a locking pin housing fixed to the armrest and configured such that the left and right locking pins are inserted into the locking pin housing while extending leftward and rightward; and
  a rotary cap and a screw configured to fix the rotary bracket to the locking pin housing so that the rotary bracket is rotatable.

11. The armrest assembly of claim 10, wherein the locking mechanism further comprises a locking pin bushing installed in the locking pin housing while extending leftward and rightward and configured such that the left and right locking pins are inserted into the locking pin bushing while extending in a longitudinal direction, the locking pin bushing being configured to guide rectilinear movements of the left and right locking pins.

12. The armrest assembly of claim 10, wherein the locking mechanism further comprises a locking pin spring positioned in the locking pin housing and having two opposite ends supported by the left and right locking pins, the locking pin spring being configured to provide an elastic force in a direction in which the left and right locking pins move away from each other.

13. A vehicle comprising:
  a left seat and a right seat in an interior of the vehicle;
  an armrest board disposed between the left seat and the right seat;
  an armrest rotatably coupled to the armrest board and configured to be extended from the armrest board by rotating forward or to be housed in the armrest board by rotating and standing;
  a speed-reduction damper mechanism connecting the armrest and the armrest board and configured to make a rotational speed of the armrest uniform by reducing the rotational speed when the armrest rotates to be extended; and a knob rotatably coupled to the armrest and configured to be manipulated by a user; and
  a locking mechanism installed in the armrest and connected to the knob by a wire, the locking mechanism being configured to:
    lock the armrest by connecting the armrest to hinge brackets of the armrest board when there is no manipulation of the knob by the user; and
    unlock the armrest by disconnecting the armrest and the hinge brackets in response to a manipulation of the knob by the user, wherein the locking mechanism comprises:
  a rotary bracket positioned in an accommodation space in the armrest, connected to the wire, and configured to rotate based on whether the wire is pulled or released;
  left and right pin holders coupled to the rotary bracket, extending in opposite leftward/rightward directions, and configured to rotate together with the rotary bracket;
  left and right locking pins respectively coupled to the left and right pin holders and configured to:
    lock the armrest while being kept simultaneously penetrating left and right surfaces of the armrest and the hinge brackets when there is no manipulation of the knob by the user; and
    unlock the armrest by disconnecting the armrest and the hinge brackets while separating from the hinge brackets in response to the manipulation of the knob by the user;
  a locking pin housing fixed to the armrest and configured such that the left and right locking pins are inserted into the locking pin housing while extending leftward and rightward;
  a rotary cap and a screw configured to fix the rotary bracket to the locking pin housing so that the rotary bracket is rotatable; and
  a locking pin bushing installed in the locking pin housing while extending leftward and rightward and configured such that the left and right locking pins are inserted into the locking pin bushing while extending in a longitudinal direction, the locking pin bushing being configured to guide rectilinear movements of the left and right locking pins.

14. The vehicle of claim 13, wherein the armrest comprises:
  an upper part having an armrest lid; and
  a lower part having the accommodation space therein, wherein the speed-reduction damper mechanism is installed and positioned in the accommodation space of the lower part.

15. The vehicle of claim 13, wherein the speed-reduction damper mechanism comprises:

a gas spring positioned in the accommodation space in the armrest, disposed in a longitudinal direction of the armrest, and having a first end coupled to the armrest;
a hinge pin fixed to a hinge bracket of the hinge brackets of the armrest board and coupled to a second end of the gas spring; and
a hinge bushing fitted with the hinge pin and configured to enable the armrest to rotate.

\* \* \* \* \*